US005125144A

United States Patent [19]

Clark

[11] Patent Number: 5,125,144

[45] Date of Patent: Jun. 30, 1992

[54] EXTRACTOR FOR BROKEN-OFF TAPS AND THE LIKE AND METHOD OF EXTRACTING SAME

[76] Inventor: Brian J. Clark, 19278 Orchard St., Southgate, Mich. 48195

[21] Appl. No.: 350,619

[22] Filed: May 11, 1989

[51] Int. Cl.[5] .............................................. B23P 19/04

[52] U.S. Cl. ........................................ 29/240; 81/53.2

[58] Field of Search .................. 29/240, 402.03, 426.4, 29/426.5; 81/53.2; 228/119

[56] References Cited

U.S. PATENT DOCUMENTS

| | | | |
|---|---|---|---|
| 2,165,485 | 7/1939 | Jackman | 29/426.4 X |
| 3,439,567 | 4/1969 | Denis | 81/53.2 |
| 3,487,733 | 1/1970 | Townsend | 29/426.5 X |
| 3,529,497 | 9/1970 | Brooks | 81/53.2 X |
| 4,138,909 | 2/1979 | Johnson | 81/53.2 |

*Primary Examiner*—Joseph M. Gorski

*Attorney, Agent, or Firm*—Dykema Gossett

[57] ABSTRACT

An extractor for a broken-off tool including a tap, drill, set screw, bolt, reamer and dowel retained within a bore in a workpiece comprises a body, there being an axial bore in the body opening at its top and towards its bottom terminating in a tapered conical throat and a coaxial cylindrical neck of reduced diameter communicating with the throat and depending from the body. The neck is adapted to nest within and protectively engage the workpiece bore and engage the workpiece. The bore, throat and neck are adapted to loosely receive a flux-coated welding rod at one end bearing against the broken tool and adjacent its other end being connected to an electrical power source, whereby on application of sufficient electrical power, the welding rod within the throat forms a weld mass interconnecting the body and the broken tool, rotation of the body withdrawing the broken tool from the workpiece. The method of extracting such broken-off tool comprises selecting a metal body having a bore opening at its top and a hollow neck communicating with the bore at its bottom; applying the body to a workpiece with the neck extending into the bore of the workpiece and engaging the tool, there being a downwardly converging throat in the body connecting the bore of the body and neck; applying an elongated flux-covered welding rod through the bore, throat and neck into operative engagement with the tool; applying a welding electric current to one end of said welding rod while grounding the workpiece; collecting melted portions of said welding rod within the throat and neck for welding the tool to the body; and upon hardening of the weld, rotating the body and attached broken tool and withdrawing the broken tool.

4 Claims, 1 Drawing Sheet

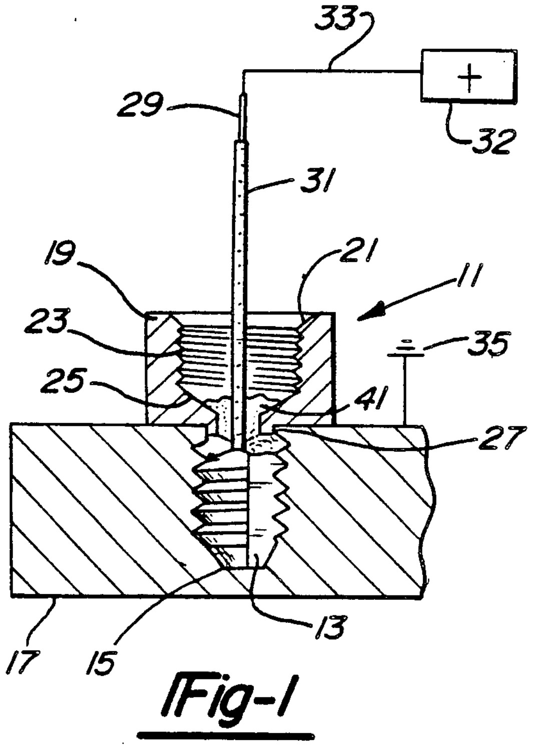
FIG-1
FIG-2
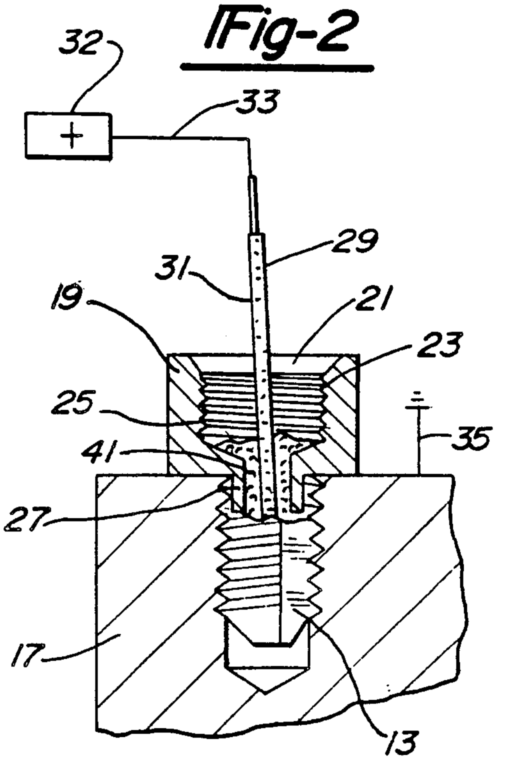
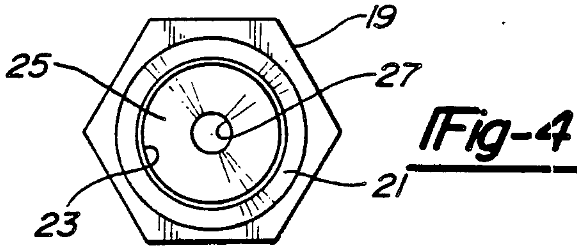
FIG-4
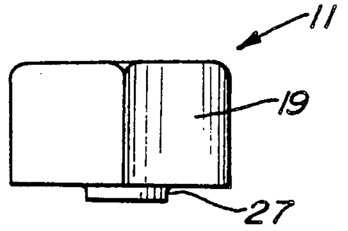
FIG-3
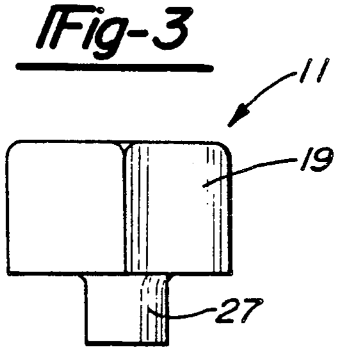
FIG-5
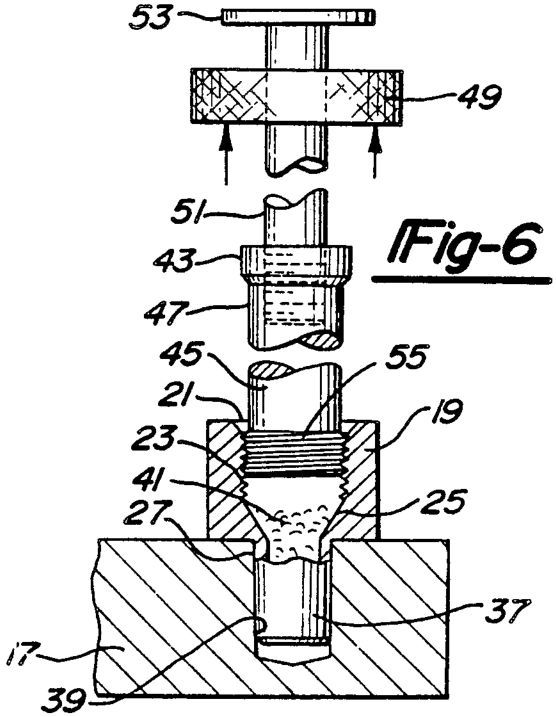
FIG-6

EXTRACTOR FOR BROKEN-OFF TAPS AND THE LIKE AND METHOD OF EXTRACTING SAME

FIELD OF INVENTION

The present invention relates to an extractor for broken-off tools including a tap, drill, set screw, bolt, reamer and dowel retained within a bore in a workpiece together with a method for extracting same.

BACKGROUND OF THE INVENTION

In the boring of holes in a workpiece or tapping threads into a bore in a workpiece, in the use of set screws, bolts, reamers and dowels within corresponding bores, often the particular tool has broken off leaving nothing or very little projecting from the workpiece with the result that it is very difficult to remove the broken-off tool part from the bore of the workpiece. Various efforts have been made to remove such tools. Apparatus previously available has not been efficient in accomplishing the desired result.

In *Machinery's Handbook.* 1Oth Edition, dated 1941, printed in New York by The Industrial Press under the heading "Removing a Broken Tap," p. 1071, it is indicated as follows: "The best and quickest method of removing a broken tap is by using a tap extractor. A design that has been proved successful is equipped with projecting fingers which enter the flutes of the tap which is backed out of the hole by turning the extractor with a wrench. This extractor is adjustable so as to support the fingers close to the tap, even when the broken end is below the surface of the work."

One difficulty in the use of the conventional tap extractor has been the problem involved when the flutes are curved rather than straight. Further, tap extractors have not been effective in achieving a sufficiently tight grip upon the broken-off part such as would permit its rotation and withdrawal from the workpiece.

The Handbook further indicates another method which consists of adding, by electric arc welding, metal onto the shank of the broken tap up to or above the level of the work. Care must be exercised to prevent depositing metal onto the threads in the tapped hole. After the shank has been built up, the head of a bolt or nut is tacked to it, and then the tap may be backed out.

Other apparatus and methods for removing broken drills or the like from apertures in a workpiece are disclosed in one or more of the following prior art patents:

| U.S. PAT. NO. | Patentee | Date Issued |
|---|---|---|
| 2,429,967 | N. A. Sorensen | October 28, 1947 |
| 2,684,526 | J. D. Hoover | July 27, 1954 |
| 2,750,821 | A. R. Hilsinger | June 19, 1956 |
| 3,161,090 | S. B. McLellan | December 15, 1964 |
| 3,279,047 | J. M. Cumberland | October 18, 1966 |
| 3,439,567 | A. P. Denis | April 22, 1969 |
| 3,529,497 | D. G. Brooks | September 22, 1970 |
| 4,138,909 | S. Johnson | February 13, 1979 |

One of the difficulties in the use of some of the prior art disclosures has been in the use of a flux with a welding electrode. Often there is such accumulation of flux upon the interior of an area where a weld is to be applied that the build-up of the flux prevents a proper weld from forming between the broken tool within the bore and the tool for extracting the broken tool from the workpiece.

Previously, there have been problems using flux which was building up and grounding out the welding electrode. The problem existed of finding a suitable means for effecting proper dissipation of the flux or flux vapor as soon as it has performed its function, namely the elimination of porosity holes in the weld.

Welding within a confined area with no place for the flux vapor to go has been one of the difficulties. One reason for this was that welding rods presently available created too much flux and hindered welding internally. Thus, the dissipation or use of flux was one of the problems with prior art structures involving welding.

Presently only one effective way of removing a broken tap exists. The process is identified as EDM (electrical discharge machining). Only a small percentage of shops have an EDM machine. Most shops must send via truck the piece of metal that contains the broken tap. An EDM machine is very expensive and utilizes a carbon electrode that actually burns out the broken tap. The EDM machine is a large machine, six feet by eight feet average, and requires a full-time operator.

SUMMARY OF THE INVENTION

An important feature of the present invention is to provide an improved extractor for broken-off tools such as taps, drills, set screws, bolts, reamers and dowels which are retained within a bore in a workpiece.

As another feature, the present extractor includes a body of hexagonal shape having a top and a bottom, there being a coaxial bore in the body opening at the top and towards the bottom terminating in an inwardly tapered throat arranged upon said axis together with a coaxial cylindrical hollow neck of reduced diameter which communicates with the throat and depends from the body.

As an important feature, the neck is of such outside diameter so as to selectively extend into the workpiece bore and of such length selectively as to operatively engage the broken-off tool within the workpiece bore.

As another feature, in the use of the present extractor, there is provided as a part of the present method an elongated welding rod, preferably of stainless steel and including a flux covering thereon and wherein the welding rod is adapted for positioning so as to extend through the bore of the body, through the conical throat therein, through the neck which depends from the body and into operative engagement with the broken-off tool or tap retained within the workpiece.

A further step includes the application of a suitable electrical power source to the electrode upon the exterior of the body and with the workpiece suitably grounded so as to provide a suitable welding temperature where the electrode engages the broken-off tool. This melts the welding rod with an accumulation of welding material within the throat within the body such that a weld is formed which interconnects the body, the throat and the broken-off tool. Upon hardening of the weld and subsequent rotation of the extractor body with the broken-off tool welded thereto, the broken-off tool is axially withdrawn or unthreaded from the bore within the workpiece.

As an important feature, in the case of a dowel which is broken-off within a plane bore within a workpiece, the present extractor provides a means of establishing a weld connection between the extractor and one end of the broken-off dowel such that upon hardening of the weld which interconnects the body and the dowel part, it may be axially withdrawn from the workpiece.

As another feature, there is provided a dowel puller adapted for threading into the bore of the extractor body and which is adapted to receive axial forces for retracting the dowel from the bore within the workpiece.

In all other types of broken-off tools except for dowels, the bore within the workpiece is interiorly threaded so that withdrawal of the present extractor tool and connected broken-off workpiece is achieved by rotation of the body of the extractor with simultaneous unthreading of the broken workpiece welded thereto until it has been withdrawn.

As another feature of the present invention, there is provided an improved method of removing a broken-off tool such as a tap, drill, set screw, bolt, reamer or dowel retained within the bore of a workpiece which includes the steps of selecting a metallic body of a hexagonal shape, having a bore opening at its top and a hollow neck communicating with the bore and depending from its bottom; applying the body to a workpiece with the neck extending into the bore of the workpiece and engaging the tool. Within the body there is provided a conical throat which communicates with the tool bore and neck so that for welding purposes an elongated flux-covered welding rod may be projected through the bore, the throat and the neck into operative engagement with the tool. A further step includes applying a welding electric current to one end of the welding rod while grounding the workpiece, bringing portions of the welding rod to a molten condition within the throated portion of the body and into the neck so as to weld portions of the body and neck to the broken tool. Upon hardening of the weld rotating the body and attached broken tool, withdrawing it from the workpiece.

These and other features and objects will be seen from the following specification and claims in conjunction with the appended drawing.

THE DRAWING

FIG. 1 is a schematic vertical section illustrating the broken-off tap within the bore of a workpiece and with the present extractor applied to the workpiece and to the broken-off tool illustrating the welding of the interiors of the extractor body and neck to axial portions of the broken-off tool.

FIG. 2 is a fragmentary similar view with the depending neck from the extractor elongated so as to extend a further distance into the bore of the workpiece for engagement with the broken-off tool.

FIG. 3 is a side elevational view of the present extractor.

FIG. 4 is a plan view thereof.

FIG. 5 is a side elevational view of an extractor corresponding to the extractor shown in FIG. 2 and having an elongated neck.

FIG. 6 is a view similar to FIGS. 1 and 2 wherein the present extractor is employed for removing a dowel from the bore of a workpiece illustrating the method steps of welding the extractor to the broken-off dowel and for withdrawing the broken-off dowel from the workpiece.

It will be understood that the above drawing illustrates merely a preferred embodiment of the invention and the preferred steps of the present method, and that other embodiments and other steps are contemplated within the scope of the claims hereafter set forth.

DETAILED DESCRIPTION OF AN EMBODIMENT OF THE INVENTION

Referring to the drawing, the present tap extractor 11 is shown in FIGS. 1, 2 and 3 and is adapted for removing a broken-off tap 13 within the threaded bore 15 of the workpiece 17 shown in FIG. 1. Referring to the broken-off tap 13, it is contemplated as a part of the present invention that the extractor may be employed for similar types of broken-off tools, as for example taps, drills, set screws, bolts, reamers or dowels 37, such as shown in FIG. 6.

In the illustrative embodiment, the present tap extractor includes a body 19 of metal, preferably steel, and is of hexagonal shape, FIG. 4. On the top of the body 19, upon the interior thereof, there is provided an annular bevel 21 which terminates in the bore 23. Under some conditions and particularly for the removal of broken-off dowels such as at 37, FIG. 6, the interior of the body 19 has a bore which is interiorly threaded.

Said bore 23 is arranged upon an upright central vertical axis and at its lower end terminates in an inwardly converging or tapered annular throat 25 which extends to the bottom of body 19. Hollow cylindrical neck 27 depends from body 19 coaxially thereof, FIGS. 1, 2 and 6.

The neck is shown reasonably short as depending from a central undersurface portion of the body, FIG. 1, and is adapted for projection into or registry with the bore 15, FIG. 1, and into engagement with the broken-off upper portion of the tap 13 illustratively shown.

In the respective FIGS. 1, 2 and 6, the inwardly converging throated opening 25 communicates with the bore 23 at its upper end and at its lower end communicates with the bore of neck 27.

It is contemplated as a part of the present invention that the length of the neck 27 may vary such as shown in FIGS. 2, 3 and 5 so that the neck is adapted to come into contact with the broken-off tool, such as the tap 13, depending upon its positioning within the threaded bore 15.

According to the present invention, the present tap extractor 11 is one of a plurality of such tap extractors within a kit so that the outside diameter of the neck 27 may vary from extractor to extractor in order to fit within the corresponding bore 15 within workpiece 17. Neck 27 protectively encloses the adjacent threads, FIGS. 1 and 2, to prevent any welding material from coming in contact therewith.

Thus, the kit may include a large number of extractors 11 which may be of different diameters than the one shown in FIG. 4. The corresponding necks 27 may be of different outside diameters in order to loosely fit within and protectively enclose the adjacent threads within bores 15 of different diameter within workpiece 17.

The kit will include tap extractors t-at have necks 27 of different lengths so that for a particular broken-off tap 13, for illustration, such as in FIG. 2, the neck will extend down into contact with the broken-off tap 13 and for protectively enclosing the adjacent threads of bore 15.

In accordance with the present method, in extracting a broken-off tap or other tool from a bore 15 in a workpiece there is employed an elongated welding rod 29, preferably constructed of stainless steel, and covered with a suitable flux 31. Said welding electrode, FIGS. 1, 2 and 6, extends through the body 19 through its bore 23, through the throat 25, through the neck 27 and is in operative engagement with the broken-off tap 13, for illustration. The present kit will include one or more welding rods of this nature, perhaps of different lengths as needed.

As a further step in the method of extracting the broken-off tap 13, an electrical power source 32 through a suitable lead 33 is connected to an upper end portion of the welding rod 29 and the workpiece is suitably grounded as at 35. This provides an electric circuit such as to form the weld 41 within the throated portion 25 of the extractor body 19 and within neck 27. The electrical power source 32 will provide such sufficient amperage, such as in the range of 70 to 90 amps, as will be sufficient to effect the weld 41, removing metal from the welding rod 29, melting into the weld mass. The weld bonds to the throat portion of body 15, and the neck 27 to the tap 13. In FIG. 6, into the bore 23 of body 19 there is threaded the shank 45 of the adapter 43 with wrench engaging flats 47. This provides an interlock between the adapter 43 and the body 19. Thereafter, and as a final step, axial forces are applied to the lifter slide hammer 49 as designated by the arrows in FIG. 6. The slide hammer is mounted on shank 51 having top bar 53. Said shank is threaded at its lower end at 55 and extends into threaded bore 23 of body 19. This provides a means to withdraw the extractor and the dowel part 37 welded thereto as at 41 from the bore 39. It may be that in some situations, extraction of the dowel will be facilitated by a limited initial rotation of the hex body 19 so as to partly loosen the dowel within bore 37. Thereafter, axial force is applied to the adapter 43 to facilitate withdrawal of the broken dowel part 37 from the bore 39 in workpiece 17, FIG. 6.

THE METHOD

The present method for removing a broken-off tool such as a tap 13, drill, set screw, bolt, reamer or dowel 37 retained within the bores 15 or 39 of a workpiece 17, FIGS. 1 and 6, includes the following steps:

(1) selecting a metallic body 19 of hexagonal shape, FIGS. 3, 4 and 5, where the body 19 includes a bore 23 which opens at the top of the body and a hollow neck 27 which communicates with the bore and depends from bottom of the body;

(2) applying the body 19 to the workpiece 17, as in FIGS. 1, 2 and 6 with the corresponding neck 27 in registry with or extending into the adjacent bore 15 or 39 within the workpiece 17 with the neck in engagement with the broken tool 13 or 37. The present method contemplating as a part of the body 19 that the bore 23 terminates at its lower end in a conical, downwardly converging throat 25 which at the lower end of the body communicates with the bore of the depending neck 27;

(3) applying an elongated flux-covered welding rod 29-31 through the bore 23, throated bore 25 and through the neck 27 into operative engagement with the broken-off tool 13 or 37, FIGS. 1 and 6;

(4) applying a welding electrical current as at 32, 33 to one end of the welding rod 29 while grounding the workpiece 17 at 35 and thereby collecting melted portions of the stainless steel welding rod 29 within the throat 25 and neck 27 for forming a weld at 41 for in effect axially welding the broken-off tool 13 to the body 19 and adjacent neck 27; and (5) the final step upon hardening of the weld of rotating the body and attached broken tool within the workpiece and withdrawing the broken tool therefrom.

In connection with the method of withdrawing a broken-off dowel 37 from a workpiece 17 as in FIG. 6, there is included the additional step of threading the dowel lifter adapter 45 down into the threaded open end of the body 19 and thereafter applying axial upward forces to the lifter or slide hammer 49, 51 so as to axially withdraw the broken tool 37 from the workpiece 17.

As a part of the foregoing method in solving the problem of accumulation of flux within a confined area, the relationship of the adjacent bores 23 and 25 provide an escape route for the vaporized flux so that it does not interfere with the proper formation of the weld 41 for interconnecting the tool body 19 and neck 27 to the broken part. The present extractor tool as tested has worked 100% of the time and allows industry an on-the-site method of removing any broken tool.

The threaded portion or bore 23 at the top of the body 19, as in FIG. 6, allows a threaded shaft or adapter 43 to be screwed into the body such as shown at 43, 45 in FIG. 6.

The present kit may contain 42 to 56 different tools. The neck OD and the length will vary to such extent depending upon the location of the broken tool and size of the workpiece bore so that the appropriate tap removal tool may be selected.

While considerable testing has revealed that most taps, bolts, or dowels break at or just above or below the surface of the workpiece, the variations of the tools provide, and particularly the length of the necks 27 in the kit, supply all variations needed depending upon where the particular workpiece breaks off within the bore of a workpiece.

The present construction provides a means by which flux or flux vapor disappears as soon as it has performed its function, namely to eliminate porosity holes in the weld such as the weld 41. The present invention has thus overcome the flux problem that heretofore existed because the welding is now referred to as external welding as distinguished from internal welding permitting an escape route for the flux vapors. The problem of the excess flux was solved by opening up the tool and allowing the flux to take its natural course, escaping through the bore of the body to atmosphere.

The size of the welding rods 29 may be varied in the present kit as well as the OD and lengths of the corresponding necks 27 so that any broken tool removal is possible. The present tools are inexpensive to manufacture, are disposable, and they function as intended. The present tools may be used with metallic inert gas as well as arc welding.

Having described my invention, reference should now be had to the following claims.

I claim:

1. An extractor for a broken-off tool including a tap, drill, set screw, bolt, reamer or dowel retained within a bore in a workpiece comprising:

a body of hexagonal shape having a longitudinal axis, a top and a bottom;

there being an axial bore in said body opening at said top and toward said bottom terminating in an upwardly tapered annular throat arranged upon said axis; and a co-axial hollow cylindrical neck of reduced diameter communicating with said throat and depending from said body;

said neck being of such outside diameter selectively as to extend into said workpiece bore, and of such length selectively as to operatively engage the broken-off tool, with said body bearing upon said workpiece, said axial bore being internally threaded.

2. In the extractor of claim 1, further comprising a lifter having a depending threaded shank threaded down into said body, axial forces applied to said lifter elevating said extractor and withdrawing the connected broken-off tool from said workpiece bore.

3. An extractor for a broken-off tool including a tap, drill, set screw, bolt, reamer or dowel retained within a bore in a workpiece comprising:

a body of hexagonal shape having a longitudinal axis, a top and a bottom;

there being an axial bore in said body opening at said top and toward said bottom terminating in an inwardly tapered annular throat arranged upon said axis; and a co-axial hollow cylindrical neck of reduced diameter communicating with said throat and depending from said body;

said neck being of such outside diameter selectively as to extend into said workpiece bore, and of such length selectively as to operatively engage the broken-off tool, with said body bearing upon said workpiece;

the bore in said workpiece being interiorly threaded, said broken-off tap, drill, set screw, bolt or reamer being tightly threaded into said bore;

said neck protectively enclosing said threads against contact with weld material; said tool being a dowel.

4. A kit for extracting broken-off tools such as taps, drills, set screws, bolts, reamers and dowels retained within a bore within a workpiece comprising:

a plurality of extractors, each extractor comprising a body having a hexagonal shape, a longitudinal axis, a top and a bottom;

there being an axial bore in said body opening at said top and toward said bottom terminating in an inwardly tapered annular throat arranged upon said axis; and a co-axial hollow cylindrical neck of reduced diameter communicating with said throat and depending from said body;

said neck being of such outside diameter selectively as to extend into said workpiece bore, and of such length selectively to operatively engage the broken-off tool, with said body bearing upon said workpiece;

the necks of the extractors being of different outside diameters to fit bores of different diameter in the workplace, the neck being of different lengths respectively for selective use to engage the broken-off tool in the workpiece, and to protectively enclose the workpiece bore;

each of said bores being threaded; and a lift tool having a threaded shank adapted for threading into said body after welding, adapted to apply an axial force to a dowel and connected body for lifting the dowel from the workpiece bore.

* * * * *